Patented Oct. 4, 1932

1,881,217

UNITED STATES PATENT OFFICE

HENRY H. MORETON, OF SANTA MONICA, CALIFORNIA, ASSIGNOR OF ONE-THIRD TO O. B. ENGLISCH, OF CHICAGO, ILLINOIS, AND ONE-THIRD TO CHARLES F. CRAIG, OF LOS ANGELES, CALIFORNIA

COMPOUND FOR TREATMENT OF OILS

No Drawing.   Application filed October 8, 1928.   Serial No. 311,243.

This invention is a substance or compound for use in purifying oils.

In the art of purifying oil it is sometimes desirable to subject the oil to an "acid treatment" i. e. to the action of sulphuric acid for the purpose of removing impurities which cannot be eliminated by any other known method. But in the usual acid treatment there is always danger of using too much acid resulting in a discoloration of the oil which is more or less permanent, and to a sufficient extent to impair its commercial value.

One of the objects of the invention is to provide a compound by means of which the oil may be safely subjected to the acid treatment. A further object is to provide a compound of the character described which may be quickly and easily produced, and which can be manufactured at a very low cost. A further object is to provide a compound in which the acid may be carried in such a way that burning or discoloration of the oil is avoided.

The invention will be hereinafter fully set forth and particularly pointed out in the claims.

The compound forming the subject matter of the invention consists of a mixture of sulphuric acid and silica. It is preferred to use silica in the form of quartz which has been finely ground, so that it will pass through screen from 400 to 200 mesh. Effective results have been obtained with quartz ground or powdered so as to pass through screens of 300 mesh. While it is preferred to use the silica in the form of ground quartz because of its high purity, the invention is not limited in this particular, because high grade sand will serve the same purpose, provided it is ground or crushed to sufficient fineness.

Experience has demonstrated that excellent results are obtained with a mixture consisting of 1 gallon of sulphuric acid to 100 pounds of silica, but these proportions may be varied without departing from the spirit of the invention.

The sulphuric acid and the silica are mixed in any desired way, for instance by placing the powdered silica in a suitable receptacle and then pouring the acid over it. The two ingredients are stirred in a suitable or desired manner until they are thoroughly intermingled, and the compound is then ready for use.

In practice, a suitable quantity, depending upon the volume of oil being treated, is deposited in the oil. By this means, the acid, because it thinly coats the silica particles, is so thoroughly and uniformly distributed throughout the oil that the desired acid reaction is obtained without that concentration of the acid which normally results in burning or discoloring the oil. After allowing the acid treated oil to stand a short time, it is preferably filtered in any of the established methods of filtering oil which are so well known in the art that it is considered unnecessary to describe the same in detail. While it is preferred to treat the oil by depositing the mixture therein, excellent results may also be obtained by mixing the substance with the clay or other material forming the filter bed, so that the acid reaction may be obtained in conjunction with the filtering operation and simultaneously therewith.

In this connection, it is to be understood that by the term "clay" as used herein is meant any of the clay or clay-like material well known in the art for filtering and bleaching oils. The different clays are known to vary somewhat in their chemical and physical characteristics, but all clays which are capable of filtering oil, or of bleaching oil, or both are considered to be within the spirit of this invention. The clay must, of course, be treated as to eliminate any water carried thereby, and any desired proportions may be used. Good results, however, have been obtained with the following mixture:—

| | |
|---|---|
| Sulphuric acid | 1 gallon |
| Silica | 100 pounds |
| Clay | 100 pounds |

The ingredients may be mixed in any desired manner, but it is preferred to first mix the acid and silica in the manner already described, and to then mix in the clay by any desired form of mechanical mixing. In practice, the compound is used as a filter, and the oil passing therethrough is bleached to a high degree without destroying its lubricating qualities.

The advantages of the invention will be readily understood by those skilled in the art of purifying and reclaiming oils. In this connection, it will be noted that a very simple and inexpensive compound has been produced by means of which the oil may be conveniently subjected to an acid treatment without danger of burning it. A further advantage is that no great skill is required to produce the compound and that its use does not involve the employment of expensive and cumbersome apparatus.

Having thus explained the nature of the invention and described an operative manner of constructing and using the same, although without attempting to set forth all of the forms in which it may be made, or all of the forms of its use, what is claimed is:—

1. A compound for purifying oils comprising a mixture of clay compounded with a mixture consisting of 1 gallon of sulphuric acid in 100 pounds of silica.

2. A compound for use in purifying oils comprising a mixture of clay compounded with a mixture of 100 pounds of quarts powdered to 300 mesh and 1 gallon of sulphuric acid.

3. A compound for use in purifying oils comprising clay combined with an approximately equal quantity by weight of extraneous finely powdered silica particles coated with sulphuric acid.

In testimony whereof I have hereunto set my hand.

HENRY H. MORETON.